United States Patent
Kratzer

(10) Patent No.: US 7,681,862 B2
(45) Date of Patent: Mar. 23, 2010

(54) MAGNET VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 11/653,926

(22) Filed: Jan. 17, 2007

(65) Prior Publication Data

US 2007/0164245 A1    Jul. 19, 2007

(30) Foreign Application Priority Data

Jan. 19, 2006   (DE) ...................... 10 2006 002 664

(51) Int. Cl.
F16K 31/02 (2006.01)
(52) U.S. Cl. .................... 251/129.02; 251/337; 267/179
(58) Field of Classification Search ............ 251/129.18, 251/129.15, 129.02, 321–323, 336–337; 267/69–70, 179
See application file for complete search history.

(56) References Cited

U.S. PATENT DOCUMENTS

| | | | |
|---|---|---|---|
| 1,534,246 A * | 4/1925 | Porsche | 123/90.52 |
| 1,903,160 A * | 3/1933 | Asbury | 123/188.3 |
| 2,514,394 A * | 7/1950 | Irving | 464/57 |
| 2,738,450 A * | 3/1956 | Matthews | 335/272 |
| 3,092,078 A * | 6/1963 | Goswick | 119/81 |
| 3,384,112 A * | 5/1968 | Smith | 137/512.1 |
| 3,695,577 A * | 10/1972 | Jespersen | 251/61.4 |
| 3,937,249 A * | 2/1976 | Suey | 137/543.13 |
| 3,939,868 A * | 2/1976 | Logsdon | 137/517 |
| 4,062,517 A * | 12/1977 | Jones | 251/322 |
| 4,475,725 A * | 10/1984 | Niemann | 267/286 |
| 4,562,997 A * | 1/1986 | Iwata et al. | 267/221 |
| 4,704,995 A * | 11/1987 | Soeters, Jr. | 123/90.5 |
| 4,827,975 A * | 5/1989 | Steiger | 137/537 |
| 4,993,376 A * | 2/1991 | Fukutome et al. | 123/90.65 |
| 5,027,854 A * | 7/1991 | Genbauffe | 137/599.17 |
| 5,246,215 A * | 9/1993 | Takamura et al. | 267/170 |
| 5,360,197 A * | 11/1994 | Reiter et al. | 251/129.21 |
| 5,653,420 A * | 8/1997 | Sell | 251/95 |
| 5,842,502 A * | 12/1998 | Palmer | 137/500 |
| 2005/0178991 A1* | 8/2005 | Goossens et al. | 251/129.07 |
| 2007/0176136 A1* | 8/2007 | Speer et al. | 251/321 |
| 2008/0197308 A1* | 8/2008 | Guggenmos et al. | 251/129.02 |

* cited by examiner

Primary Examiner—John K Fristoe Jr
Assistant Examiner—Marina Tietjen
(74) Attorney, Agent, or Firm—Ronald E. Greigg

(57) ABSTRACT

A magnet valve having a valve insert and a tappet, guided movably in the valve insert via a tappet guide, which tappet is braced, via a restoring spring resting on a contact face of the tappet, is braced on a valve body. According to the invention, fixation means which define a rotational position of the restoring spring relative to the tappet are disposed on the contact face of the tappet.

4 Claims, 2 Drawing Sheets

MAGNET VALVE

REFERENCE TO FOREIGN PATENT APPLICATION

This application is based on German Patent Application No. 10 2006 002 664.0 filed 19 Jan. 2006, upon which priority is claimed.

BACKGROUND OF THE INVENTION

1. Field of the Invention

The invention is directed to an improved magnet valve.

2. Description of the Prior Art

A conventional magnet valve, particularly for a hydraulic unit of the kind used for instance in an anti-lock brake system (ABS) or traction control system (TCS) or an electronic stability program system (ESP), is shown in FIG. 4. As FIG. 4 shows, the conventional magnet valve 40, which is open when without current, includes not only a magnet unit 5 with a cover plate 12 but also a valve cartridge, which includes a capsule 6, a valve insert 1, a tappet 20, a restoring spring 30, and an armature 7. In the production of the magnet valve 40, the capsule 6 and the valve insert 1 of the valve cartridge are joined together by pressing, and by means of a sealing weld 8, the valve cartridge is hydraulically sealed off from the atmosphere. In addition, the valve insert 1 absorbs the pressure forces that occur in the hydraulic system and conducts them via a calked flange 9 to a calked region, not shown, on a fluid block. The valve insert 1 moreover receives the so-called valve body 4, which includes a valve seat 10 into which the tappet 20 plunges in sealing fashion, in order to perform the sealing function of the magnet valve 40. As FIG. 4 also shows, the tappet 20 and the restoring spring 30 are guided in the valve insert 1; the tappet 20 is guided in a tappet guide 11; and the restoring spring 30 is guided radially on one end on the tappet 20 and rests in centered fashion on a contact face 21, while on the other end it rests, axially guided, on the valve body 4. FIG. 5 shows a conventional exemplary embodiment of the tappet 20. As can be seen from FIG. 5, the conventional tappet 20 includes the axial contact face 21; a spring guide 22 onto which the restoring spring 30 is slipped and guided inward radially in the short region of the spring guide 22; a tappet cone 23 is a transitional region between the spring guide 22; and a tappet dome 24, which plunges sealingly into the valve seat 10. No further fixation or centering of the restoring spring 30 at its installation site is provided for.

OBJECT AND SUMMARY OF THE INVENTION

The magnet valve of the invention has the advantage over the prior art that fixation means are located on a contact face of a tappet for a restoring spring and define a rotational position of the restoring spring relative to the tappet. Because of the fixation of the restoring spring, any degrees of freedom that may be present in terms of the spring position and location can advantageously be defined, and a favorable influence can thus be exerted on associated static and dynamic effects, such as vibration, radial deflections, and so forth, and their effects on surrounding components. Thus tappet wear in particular can be reduced; such wear occurs when the comparatively hard restoring spring, made for instance from steel, moves rotationally relative to the soft tappet, made for instance from plastic. In addition, the defined rotational position of the restoring spring makes it possible for the regulating/control behavior of the magnet valve of the invention to be determined precisely in advance, and deviations inside the valve, which can occur in different work cycles of the valve, can be reduced. Moreover, the deviations between a plurality of valves of the same type can advantageously be reduced.

By the provisions and refinements disclosed, advantageous improvements to the magnet valve are possible.

It is especially advantageous that the fixation means have an opening, in which an end, resting on the contact face of the tappet, of the restoring spring is fixed against rotation by nonpositive and/or positive engagement. The opening, which is open at the top, advantageously makes easy installation of the restoring spring possible. To improve the fixation in the opening, the end, resting on the contact face of the tappet, of the restoring spring can be lengthened tangentially by a spring extension. The opening is defined laterally by a first guide lug and a second guide lug, which protrude from the contact face of the tappet. When the restoring spring is fixed by a positive engagement with the opening, the restoring spring is installed oriented toward the tappet.

In an embodiment of the magnet valve of the invention, the first guide lug and the second guide lug are each embodied as clip connectors and/or snap connectors, into which for instance the end of the restoring spring or the tangential spring extension snaps upon introduction into the opening. As a result, the guidance and fixation of the restoring spring in the opening can be improved further. Moreover, the spring end is advantageously prevented from lifting from the contact face of the tappet. Alternatively or in addition, an undercut can be made in the first guide lug and/or in the second guide lug, which undercut guides and/or clamps the end of the restoring spring or the tangential spring extension in place.

Advantageous embodiments, described below, of the invention and the conventional exemplary embodiment explained above for the sake of better comprehension of these embodiments, are more fully described herein below.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
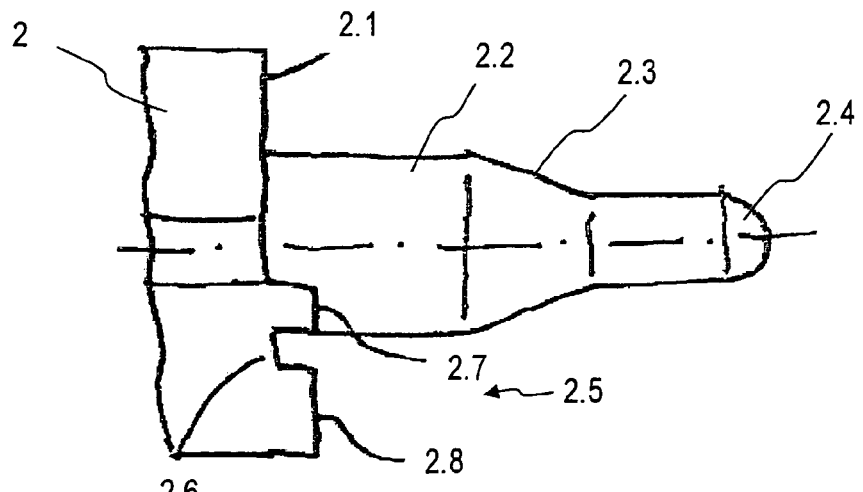
FIG. 1 is a schematic side view of a part, essential to the invention, of a tappet for a magnet valve.
Figure 2:
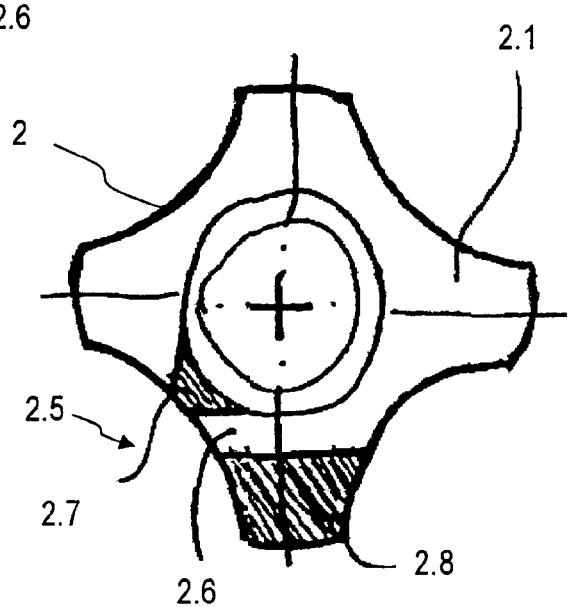
FIG. 2 is a schematic front view of the tappet of FIG. 1.
Figures 4, 5:
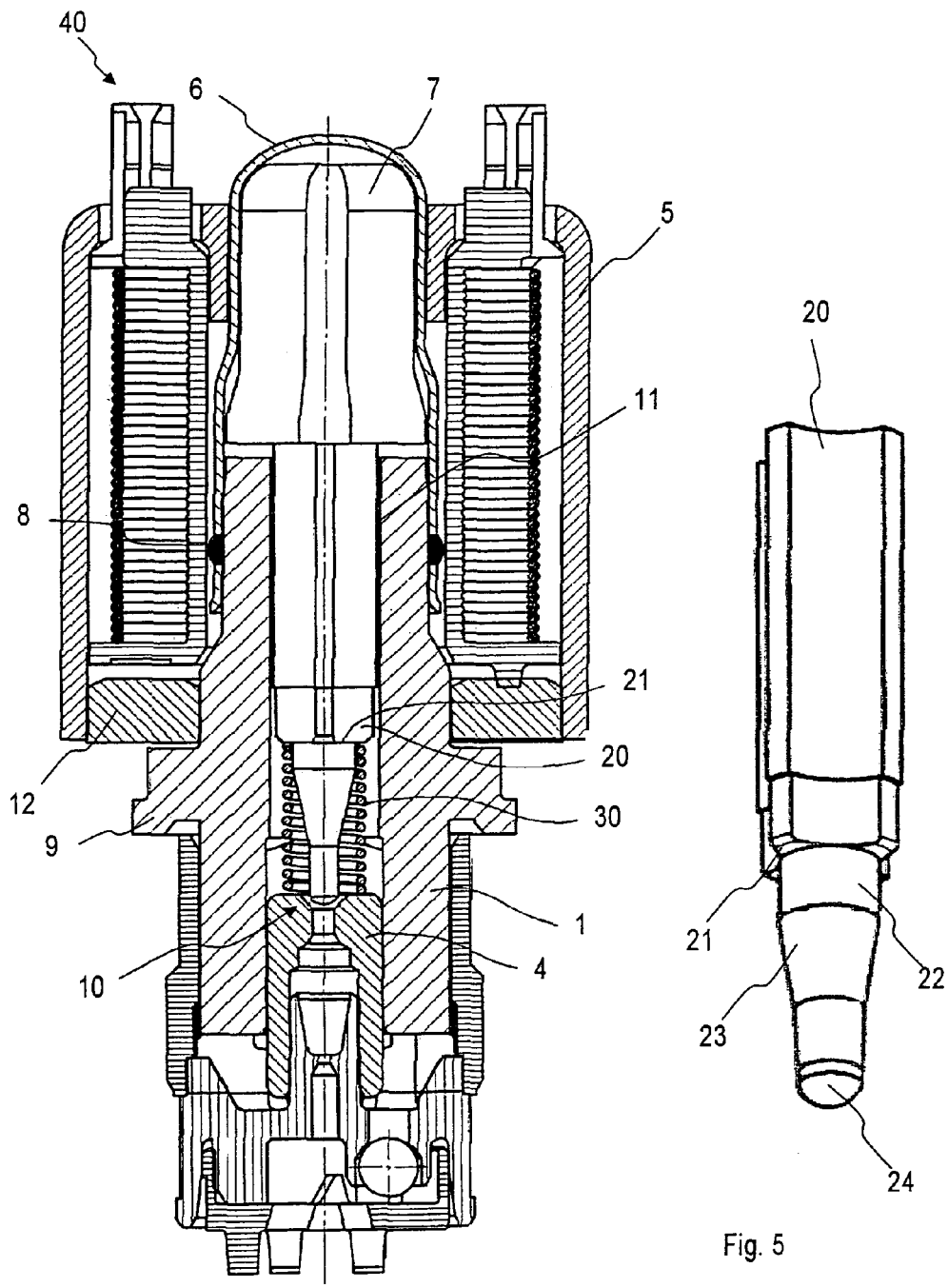
FIG. 4 is a schematic sectional view of a conventional magnet valve.
FIG. 5 is a schematic perspective view of a tappet for the conventional magnet valve of FIG. 4.

FIGS. 1 and 2 show a tappet 2 of the invention, which replaces the conventional tappet 20 of FIG. 5 in a magnet valve 40 of FIG. 4. As can be seen from FIGS. 1 and 2, a tappet 2 according to the invention for magnet valve 40, which tappet is guided movably in a valve insert 1 of the magnet valve 40 via a tappet guide 11, includes a contact face 2.1 for one end of a restoring spring 3 which replaces spring 30 of FIG. 4 the other end of which spring 3 rests axially on a valve body 4. According to the invention, fixation means 2.5 are located on the contact face 2.1 of the tappet 2 and define a rotational position of the restoring spring 3 relative to the tappet 2. As also seen from FIGS. 1 and 2, the fixation means 2.5 have an opening 2.6, in which the end, resting on the contact face 2.1 of the tappet 2, of the restoring spring 3 is fixed against rotation by nonpositive and/or positive engagement.

Figure 3:
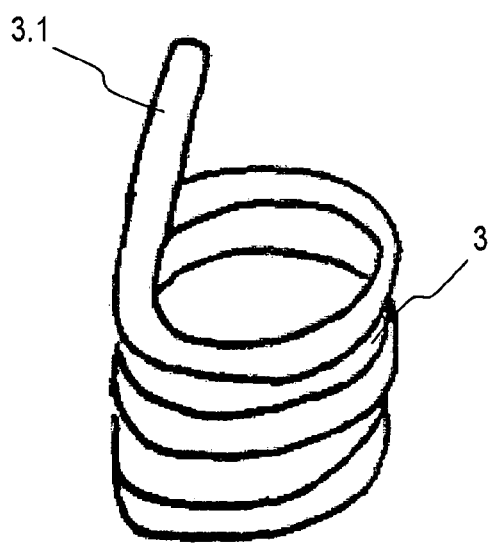
FIG. 3 is a schematic perspective view of a restoring spring for a magnet valve.

To improve the fixation, the restoring spring 3 can have a spring extension 3.1, shown in FIG. 3, which tangentially lengthens the end of the restoring spring 3 that rests on the contact face 2.1 of the tappet 2.

As can also be seen from FIGS. 1 and 2, the opening 2.6 is defined laterally by a first guide lug 2.7 and a second guide lug 2.8, which protrude from the contact face 2.1 of the tappet 2. The first guide lug 2.7 and the second guide lug 2.8 are each embodied as clip connectors and/or snap connectors, into which the end of the restoring spring 3 or the tangential spring extension 3.1 snaps into place upon introduction into the opening 2.6.

In an alternative embodiment, not shown, an undercut is made in the first guide lug 2.7 and/or in the second guide lug 2.8, which undercut guides and/or clamps the end of the restoring spring 3 or the tangential spring extension 3.1 in place.

The foregoing relates to preferred exemplary embodiments of the invention, it being understood that other variants and embodiments thereof are possible within the spirit and scope of the invention, the latter being defined by the appended claims.

I claim:

1. A magnet valve comprising a valve insert, a tappet guided movably in the valve insert via a tappet guide, a valve body, a restoring spring resting on a contact face of the tappet and bracing the tappet on the valve body, and fixation means disposed on the contact face of the tappet, the fixation means defining a rotational position of the restoring spring relative to the tappet, wherein the fixation means comprises an opening, in which an end, resting on the contact face of the tappet, of the restoring spring is fixed against rotation, wherein the opening is defined laterally by a first guide lug and a second guide lug, which guide lugs protrude from the contact face of the tappet, wherein the end, resting on the contact face of the tappet, of the restoring spring is lengthened tangentially by a spring extension.

2. The magnet valve as defined by claim 1, wherein the first guide lug and the second guide lug are each embodied as snap connectors, into which the end of the restoring spring or the tangential spring extension snaps upon introduction into the opening.

3. The magnet valve as defined by claim 1, wherein the restoring spring is installed on the tappet so that the longitudinal axis of the restoring spring is coaxial to the tappet's longitudinal axis.

4. The magnet valve as defined by claim 2, wherein the restoring spring is installed on the tappet such that the longitudinal axis of the restoring spring is coaxial to the tappet's longitudinal axis.

* * * * *